United States Patent [19]
Davison et al.

[11] Patent Number: 5,676,718
[45] Date of Patent: Oct. 14, 1997

[54] COMPUTER DRIVE BAY COVER WITH FILTER

[76] Inventors: Lloyd S. Davison; Sharon M. Davison, both of 2081 Peace Way, Turlock, Calif. 95382

[21] Appl. No.: 712,301

[22] Filed: Sep. 11, 1996

[51] Int. Cl.$^6$ ............................................. B01D 46/00
[52] U.S. Cl. ........................ 55/385.6; 55/493; 55/506; 55/524; 55/385.1; 210/488; 210/489; 210/498
[58] Field of Search ....................... 55/385.6, 385.1, 55/419, 481, 493, 502, 506, 508, 524, DIG. 24, DIG. 31, 332, 444, 445, 446, 465; 210/488, 489, 498

[56] References Cited

U.S. PATENT DOCUMENTS

| | | | |
|---|---|---|---|
| 4,321,064 | 3/1982 | Vargo | 55/446 |
| 4,340,402 | 7/1982 | Catron | 55/528 |
| 4,659,349 | 4/1987 | Rodi et al. | 55/385.4 |
| 4,689,058 | 8/1987 | Vogt et al. | 55/279 |
| 4,721,567 | 1/1988 | Uram | 210/489 |
| 4,784,675 | 11/1988 | Leber et al. | 55/385.1 |
| 4,889,542 | 12/1989 | Hayes | 55/385.6 |
| 5,462,569 | 10/1995 | Benjamin | 55/385.6 |

FOREIGN PATENT DOCUMENTS

| | | | |
|---|---|---|---|
| 405261227A | 10/1993 | Japan | 55/DIG. 31 |

*Primary Examiner*—Jay H. Woo
*Assistant Examiner*—Minh-Chau T. Pham

[57] ABSTRACT

A computer drive bay cover with filter including a cover plate that has a front panel with a peripheral overhang. The front panel has a plurality of linear slots cut at a slant. The overhang has a pair of side portions with a pair of elongated projections for forming a rear channel. A filter sheet is positionable within the rear channel of the cover plate. Lastly, a rear panel is provided. The rear panel has an elongated rear edge that is hingedly coupled to the overhang. The rear panel has a bottom side with a plurality of pile-type fasteners that couple with a plurality of pile type fasteners affixed to a central processing unit housing. The rear panel is secured to the central processing unit housing for positioning of the cover plate, with the filter sheet, over a drive bay of the central processing unit housing.

1 Claim, 3 Drawing Sheets

COMPUTER DRIVE BAY COVER WITH FILTER

BACKGROUND OF THE INVENTION

1. Field of the Invention

The present invention relates to a computer drive bay cover with filter and more particularly pertains to providing protective covering for the drive bay of a central processing unit housing and further providing a dust cover.

2. Description of the Prior Art

The use of a dust cover is known in the prior art. More specifically, Dust covers heretofore devised and utilized for the purpose of protection of computer components are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,417,743 to Dauber discloses a self-adhesive vent filter and absorbent assembly with a diffusion tube. U.S. Pat. No. 5,223,006 to Moran, III discloses an air cleaner box for a computer. U.S. Pat. No. 5,163,870 to Cooper discloses a protective dust cover for computer components. U.S. Pat. No. 4,980,785 to Talmadge discloses a disk drive slot dust protector. U.S. Pat. No. 4,889,543 to Hayes discloses a computer air filter device and method. Lastly, U.S. Pat. No. 4,112,471 to Pollard and Stven discloses a disk cartridge contamination shield.

While these devices fulfill their respective, particular objectives and requirements, the aforementioned patents do not describe computer drive bay cover with filter that allows the deflection of spilled liquid and dust particles and protects the drive bay from small children.

In this respect, the computer drive bay cover with filter according to the present invention substantially departs from the conventional concepts and designs of the prior art, and in doing so provides an apparatus primarily developed for the purpose of providing protective covering for the drive bay of a central processing unit housing and further providing a dust cover.

Therefore, it can be appreciated that there exists a continuing need for a new and improved computer drive bay cover with filter which can be used for providing protective covering for the drive bay of a central processing unit housing and further providing a dust cover. In this regard, the present invention substantially fulfills this need.

SUMMARY OF THE INVENTION

In view of the foregoing disadvantages inherent in the known types of dust covers now present in the prior art, the present invention provides an improved computer drive bay cover with filter. As such, the general purpose of the present invention, which will be described subsequently in greater detail, is to provide a new and improved computer drive bay cover with filter and method which has all the advantages of the prior art and none of the disadvantages.

To attain this, the present invention essentially comprises a cover plate. The cover plate has a front panel with a peripheral overhang therearound. The front panel has an interior face adjacent the peripheral overhang. The front panel has a plurality of linear slots cut at a slant. The overhang has a front portion, a rear portion and a pair of side portions. Each side portion of the overhang has an interior surface with a pair of elongated projections for forming a front channel and a rear channel. Included is a generally rectangular rear panel that has an elongated front edge and an elongated rear edge. The rear edge is hingedly coupled to the rear portion of the overhang for allowing movement of the cover plate. The rear panel has a bottom side with a plurality of pile-type fasteners that are adhered to the bottom side. The pile-type fasteners of the rear panel are coupled with a plurality of pile type fasteners affixed to a central processing unit housing. The rear panel is secured to the central processing unit housing for positioning of the cover plate over a drive bay of the central processing unit housing. Also, a filter sheet is provided. The filter sheet has an outside surface and a peripheral end edge around the outside surface. The filter sheet has a plurality of linear slats formed therein. Each slat is separated from another slat by a linear opening. The filter sheet is of a size and shape for positioning within the rear channel of the overhang of the cover plate at the peripheral end edge. The outside surface is spaced from the interior face of the cover plate and each slat is positioned behind each linear slot. Finally, an adhesive means is permanently adhered to the outside surface of the filter sheet. The adhesive means will attracting dust particles within the cooling air entering the central process unit housing through the cover plate.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved computer drive bay cover with filter which has all of the advantages of the prior art Dust covers and none of the disadvantages.

It is another object of the present invention to provide a new and improved computer drive bay cover with filter which may be easily and efficiently manufactured and marketed.

It is further object of the present invention to provide a new and improved computer drive bay cover with filter which is of a durable and reliable constructions.

An even further object of the present invention is to provide a new and improved computer drive bay cover with filter which is susceptible of a low cost of manufacture with regard to both materials and labor, and which accordingly is then susceptible of low prices of sale to the consuming public, thereby making such computer drive bay cover with filter economically available to the buying public.

Even still another object of the present invention is to provide a computer drive bay cover with filter for providing protective covering for the drive bay of a central processing unit housing and further providing a dust cover.

Lastly, it is an object of the present invention to provide a new and improved computer drive bay cover with filter including a cover plate that has a front panel with a peripheral overhang. The front panel has a plurality of linear slots cut at a slant. The overhang has a pair of side portions with a pair of elongated projections for forming a rear channel. A filter sheet is positonable within the rear channel of the cover plate. Lastly, a rear panel is provided. The rear panel has an elongated rear edge that is hingedly coupled to the overhang. The rear panel has a bottom side with a plurality of pile-type fasteners that couple with a plurality of pile type fasteners affixed to a central processing unit housing. The rear panel is secured to the central processing unit housing for positioning of the cover plate, with the filter sheet, over a drive bay of the central processing unit housing. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
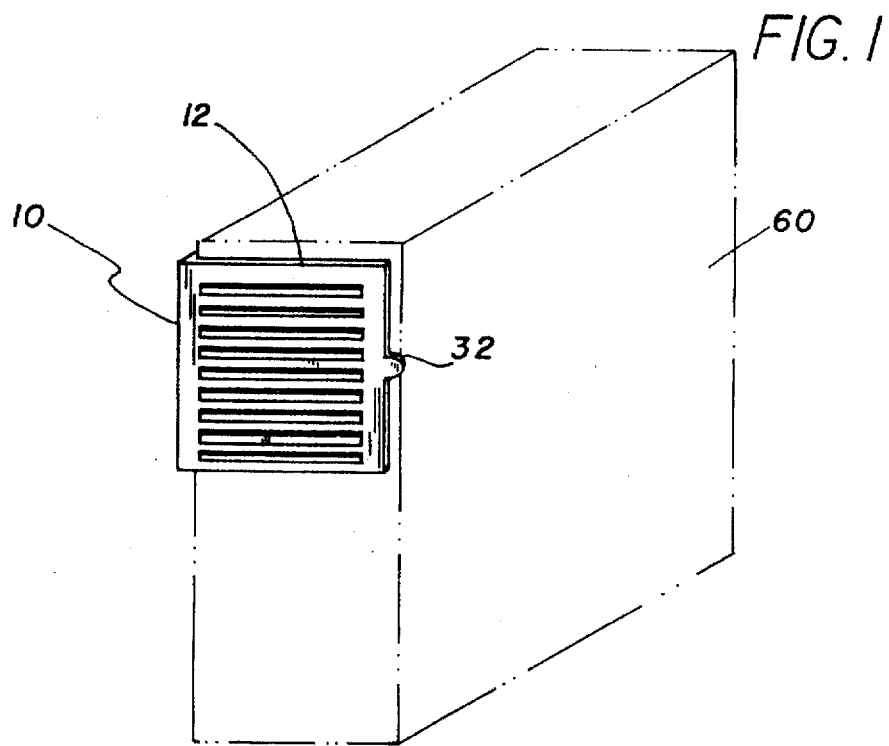
FIG. 1 is a perspective view of the preferred embodiment of the computer drive bay cover with filter constructed in accordance with the principles of the present invention.
Figure 2:
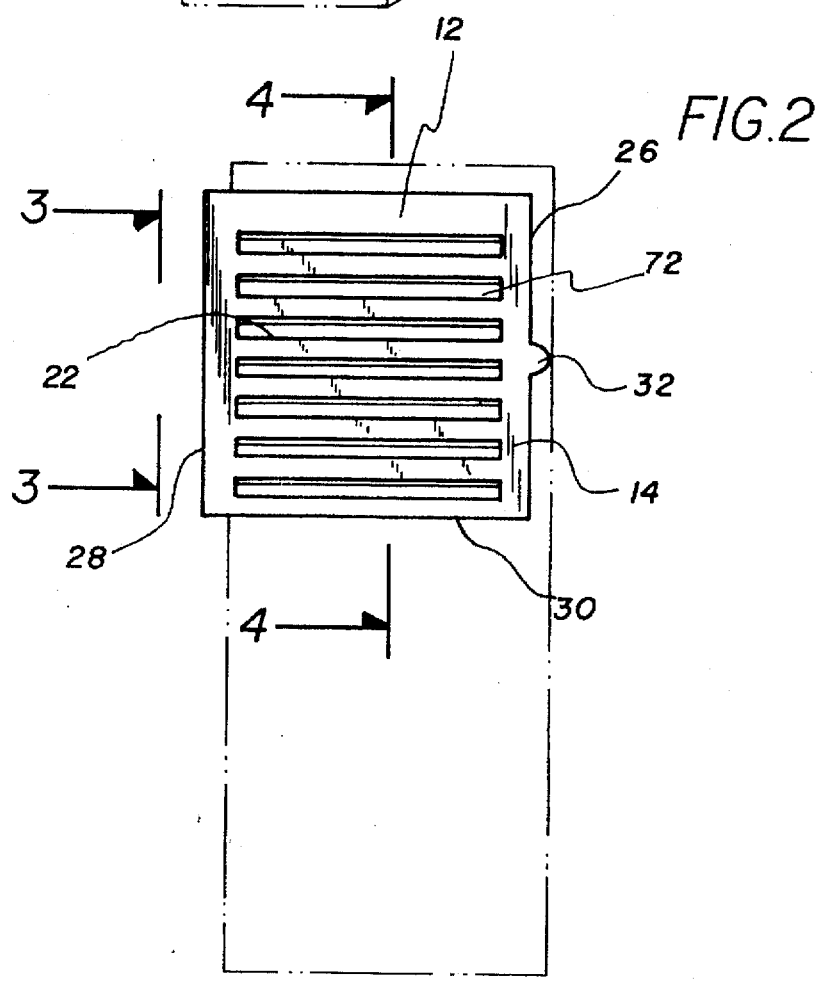
FIG. 2 is a frontal view of the present invention in an operable orientation.
Figure 3:
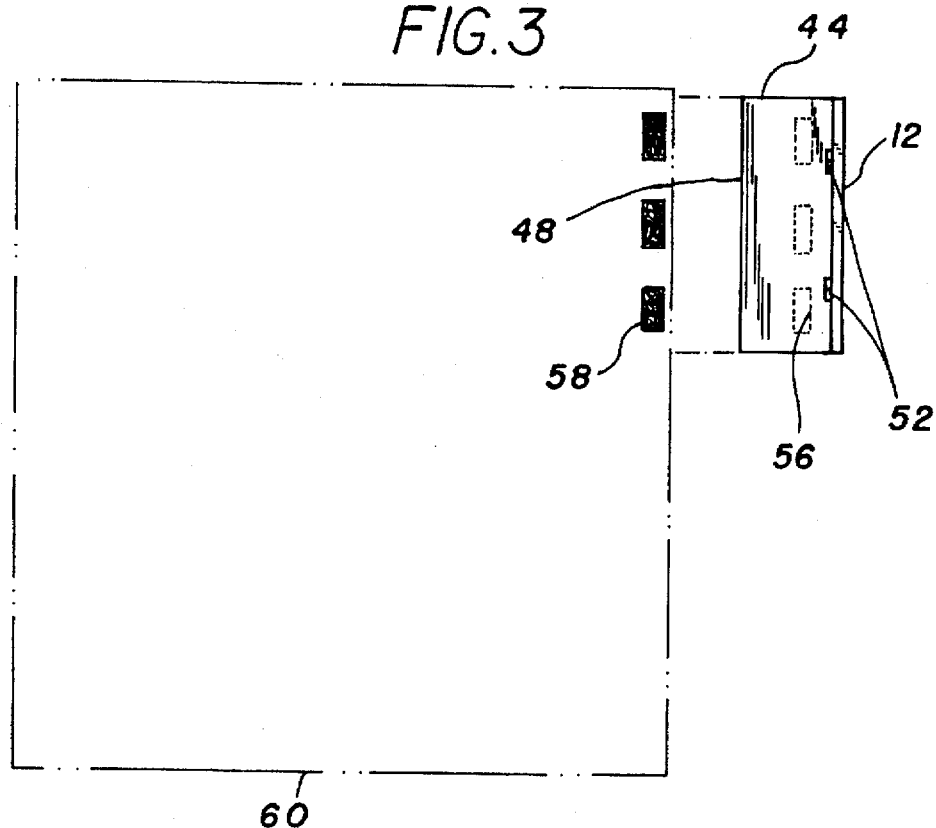
FIG. 3 is an exploded view of the present invention taken along line 3—3 of FIG. 2.

With reference now to the drawings, and in particular to FIG. 1 thereof, the preferred embodiment of the new and improved computer drive bay cover with filter embodying the principles and concepts of the present invention and generally designated by the reference numeral 10 will be described.

The present invention, the computer drive bay cover with filter 10 is comprised of a plurality of components. Such components in their broadest context include a cover plate, rear panel and a filter. Such components are individually configured and correlated with respect to each other so as to attain the desired objective.

Figure 4:
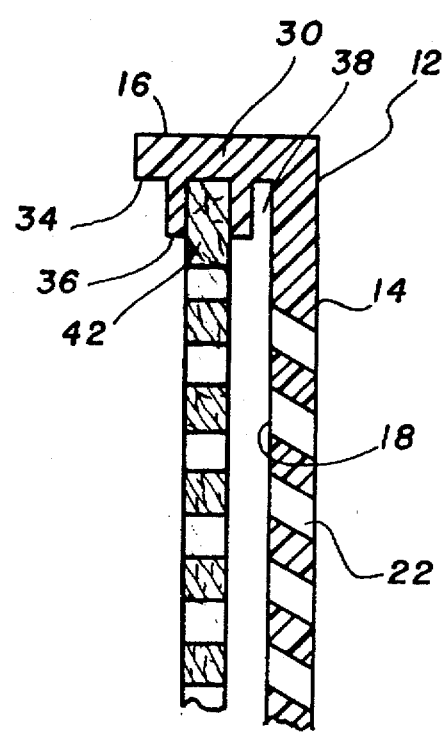
FIG. 4 is a cut-away cross-sectional view of the present invention taken along line 4—4 of FIG. 2.

Specifically, the present invention includes a cover plate 12. The cover plate is a rigid plastic that has a front panel 14 with a peripheral overhang 16. As shown in FIG. 4, the front panel having an interior face 18 adjacent the peripheral overhang. The front panel has a plurality of linear slots 22 cut at a slant through the front panel. The slanting of the slots prevents objects from being inserted through the cover plate and diverts spilled liquids from passing through the cover plate. The overhang has a front portion 26, a rear portion 28 and a pair of side portions 30. The front portion of the over hang has a handle 32 fixedly attached. Each side portion of the overhang has an interior surface 34 with a pair of elongated projection 36 for forming a front channel 38 and a rear channel 42.

Figure 6:
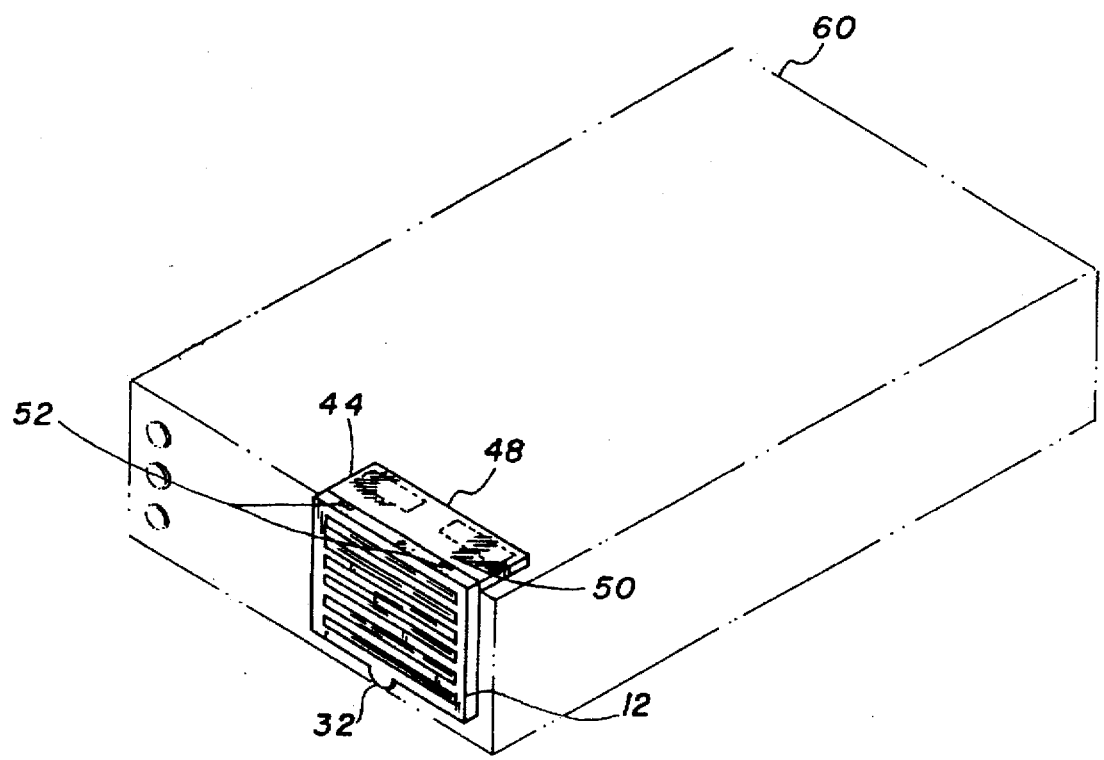
FIG. 6 is an isometric view of the present invention coupled to an alternative embodiment of the central processing unit.

Also, included is a generally rectangular rear panel 44. The rear panel, as seen in FIG. 6, has an elongated front edge 48 and an elongated rear edge 50. The rear panel is made from the same material as the cover plate. The rear panel is about ¼ the width of the cover plate and has the same length as the cover plate. The rear edge is hingedly coupled to the rear portion of the overhang with a pair of spring hinges 52.

Additionally, the hinges allow the cover plate to be moved back and forth with respect to the rear panel when the handle 32 is pulled. The rear panel has a bottom side with a plurality of pile-type fasteners 56 adhered thereto. The pile-type fasteners of the rear panel are coupled with a plurality of pile type fasteners 58 affixed to a central processing unit housing 60. The rear panel is secured to the central processing unit housing for positioning of the cover plate over a drive bay of the central processing unit housing. FIGS. 1 and 6 show the cover plate as supported on the central processing unit housing by the rear panel.

Figure 5:
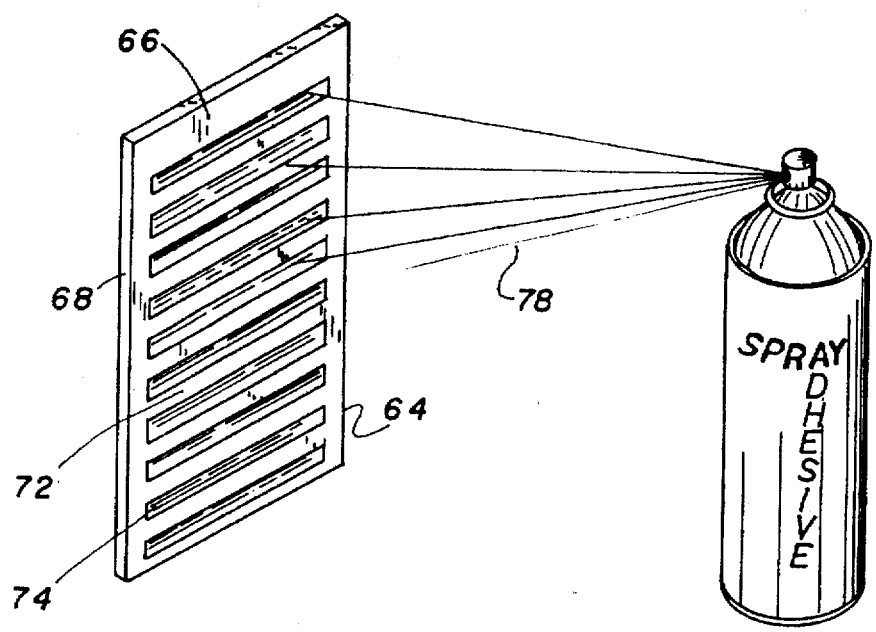
FIG. 5 is an isometric view of the filter having an adhesive means strayed thereon.

As best illustrated in FIG. 5, a filter sheet 64 is provided. The filter sheet has an outside surface 66 and a peripheral end edge 68. The filter sheet has a plurality of linear slats 72 formed therein. As shown, each slat is separated from another slat by a linear opening 74. The filter sheet is of a size and shape for positioning within the rear channel 42, of the overhang of the cover plate, at the peripheral end edge. The outside surface, as seen in FIG. 4, is spaced from the interior face 18 of the cover plate. When the filter sheet is positioned in the rear channel of each side portion of the overhang, the slats are aligned with the slots 22 of the cover plate 12. Each slat is positioned behind each linear slot for aiding in fluid deflection.

Lastly, an adhesive means 78 is permanently adhered to the outside surface 66 of the filter sheet 64. The adhesive is a non-drying glue that is sprayed onto the outside surface of the filter sheet. The adhesive means will attract dust particles within the cooling air entering the central process unit housing through the cover plate.

The present invention computer drive bay cover with filter comes in two models that have the same structure but different dimensions. One model is used as a cover on tower type central processing unit housing. Another model is used as a cover on the standard style computer housing. Both models provide a protective cover device that is make from lightweight material. The cover plate and the rear panel are coupled by a spring hinge will close automatically after allowing access to the drive bay. A filter is positioned within the rear channel of the cover plate. Prior to positioning of the filter, it is sprayed with an adhesive that will make the outside surface tacky. As air is pulled toward the drive bay, the filter will remove the dust particles. Once the filter is covered with dust, it can be easily replaced by another filter.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved computer drive bay cover with filter for protecting the drive bay against damage from spills and toddlers comprising in combination:

a cover plate having a front panel with a peripheral overhang therearound, the front panel having an interior face adjacent the peripheral overhang, the front panel having a plurality of linear slots cut at a slant therethrough for preventing the insertion of objects through the cover plate, the linear slots being at a slant to divert liquids spilled onto the cover, the overhang having a front portion, a rear portion and a pair of side portions, each side portion of the overhang having an interior surface with a pair of elongated projections for forming a front channel and a rear channel;

a generally rectangular rear panel having an elongated front edge and an elongated rear edge, the rear panel being about ¼ a width of the cover plate with a length equal to a length of the cover plate, the rear edge being hingedly coupled to the rear portion of the overhang for allowing movement of the cover plate with a back and forth motion with respect to the rear panel, the rear panel having a bottom side with a plurality of pile-type fasteners being adhered thereto, the pile-type fasteners of the rear panel being capable of coupling with a plurality of pile type fasteners affixed to a central processing unit housing, the rear panel being secured to the central processing unit housing for positioning of the cover plate over a drive bay of the central processing unit housing;

a filter sheet having an outside surface and a peripheral end edge therearound, the filter sheet having a plurality of linear slats formed therein with each slat being separated from another slat by a linear opening, the filter sheet being sized for positioning within the rear channel of the overhang of the cover plate at the peripheral end edge thereof, the outside surface being spaced from the interior face of the cover plate with the each slat positioned behind each linear slot for aiding in fluid deflection; and an adhesive means being permanently adhered to the outside surface of the filter sheet for attracting dust particles within the cooling air entering the central process unit housing through the cover plate.

* * * * *